Jan. 21, 1941.                M. P. BLOMBERG                2,229,365
                    JOURNAL BOX END THRUST ARRANGEMENT
                Filed Sept. 28, 1936         2 Sheets—Sheet 1

Inventor
Martin P. Blomberg
By Blackmore, Spencer & Flint
Attorneys

Inventor
Martin P. Blomberg
By Blackmore, Spencer & Flint
Attorneys

Patented Jan. 21, 1941

2,229,365

UNITED STATES PATENT OFFICE 2,229,365

JOURNAL BOX END THRUST ARRANGEMENT

Martin P. Blomberg, Hinsdale, Ill., assignor to General Motors Corporation, Detroit, Mich., a corporation of Delaware Application September 28, 1936, Serial No. 102,854

9 Claims. (Cl. 308—41)

This invention relates to railway vehicles, and more particularly to the provision of novel means in the axle journal boxes of same to absorb or cushion the end thrust load which is developed when the axles and the trucks of the vehicle move sidewards relative to each other as the vehicle enters or leaves curved sections of track, or as the body of the vehicle sways sidewards during movement of the vehicle over rough or uneven roadbeds.

In the conventional axle and journal box construction, endwise movement of the axle relative to the truck is limited by the engagement of a flange on the axle with the end of the usual bearing member which is carried in the journal box, but since the loads which are created by such end thrust often amount to several thousands of pounds, the end portions of the bearing members wear away much more rapidly than do the portions which take the radial load, with the result that frequently the bearing members must be replaced long before their useful life for taking radial loads has been reached, simply because they have become badly worn at their ends where the end thrust loads are taken.

It is, therefore, an object of this invention to provide a journal box structure which is so devised that the usual bearing member which takes the radial loads has nothing to do with taking the end thrust loads, there being a separate bearing member supported in the journal box in such position that after the axle has moved a predetermined amount relative to the journal box, the end of the axle comes into engagement with this bearing member with the result that the end thrust load is taken at this point, and since the bearing member which takes the radial loads is relieved of the duty of taking end thrust loads and therefore does not become worn therefrom, its useful life is increased greatly.

A further object is to resiliently support in the journal box the bearing member which takes the end thrust loads, so that the impact which takes place when the end of the axle comes into sudden engagement with the bearing member will be cushioned, and part of the end thrust load will be absorbed by the resilient means, thereby lessening the wear on the bearing member and consequently increasing its life.

Other objects of the invention will be apparent upon referring to the following description and accompanying drawings, in which Fig. 1 is a fragmentary view showing one end of a railway vehicle axle with one of the wheels mounted thereon and the journal box within which my invention is provided.

Figure 1:
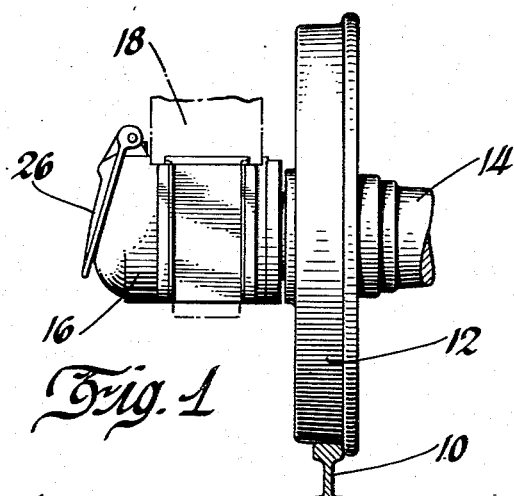

Referring to Fig. 1, 10 indicates a rail and 12 is one of the vehicle wheels which is secured upon the axle 14. 16 is the journal box which is supported in the usual manner in the truck pedestal 18, and 20 is a bearing member which supports the load of the vehicle upon the bearing portion 22 of the axle. This bearing member is secured in the journal box in the usual manner by a wedge 24 of conventional construction. A cover 26 serves to close the outer end of the journal box, and a dust guard 28 located at the opposite end of the journal box keeps dirt from getting into the journal box and prevents the escape of lubricant therefrom.

Figure 3:
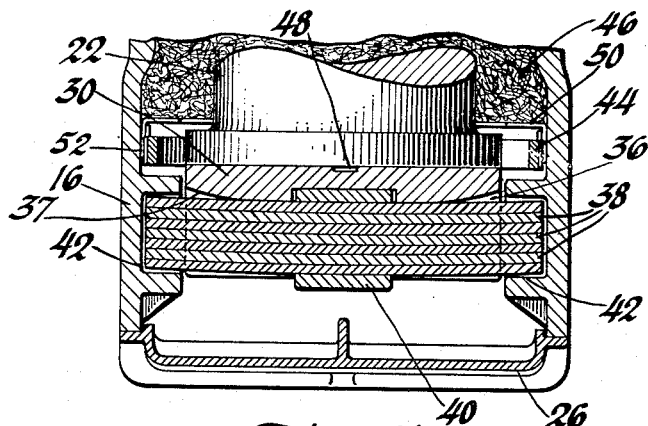
Fig. 3 is a sectional view taken on the line 3—3 of Fig. 2.
Figure 4:
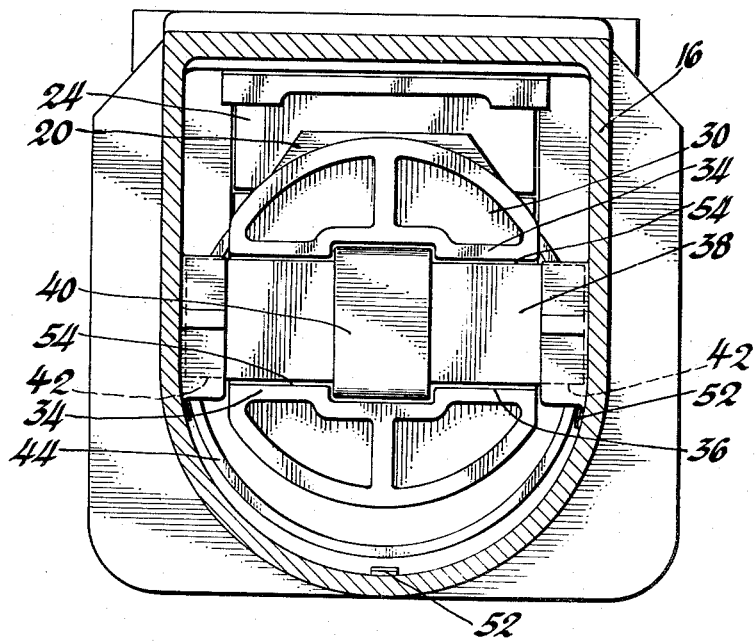
Fig. 4 is a sectional view taken on the line 4—4 of Fig. 2.

30 is an end thrust plate which may be made of bronze or other suitable bearing material, and the end of the axle, which may be enlarged as at 32 to provide an increased bearing area, normally either rests lightly against this end thrust plate or is slightly out of contact with it so that there will be no friction developed at this point and therefore no wear of either the end thrust plate or the end of the axle will take place. Walls or ribs 34 are formed on the end thrust plate and serve to provide between them a pocket 36 within which are located a plurality of leaf springs 38 which are secured together by a band or clip 40 at their central portion. As shown in Fig. 3, the ends of these springs are supported in pockets 42 formed in the side walls of the journal box, which pockets are closed at their lower portions to form a support for the leaf springs and are open at their upper portions to permit the leaf springs to be dropped into the pockets through the opening in the end of the journal box when the cover 26 is lifted upwardly.

It will be seen that the end thrust plate 30 is thus supported solely by the leaf springs which are in turn supported at their ends in the journal box. There is normally a clearance of approximately ⅛ inch between the end of the axle and the end thrust plate. As the axle moves outwardly with respect to the journal box or as the latter is moved inwardly with respect to the axle due to the tendency of the car body to move sidewise under certain conditions, after this clearance has been taken up, the end of the axle comes into contact with the thrust plate, and further movement causes the spring leaves 38 to be deflected, during which deflecting action a considerable amount of friction is developed between the adjacent surfaces of the various spring leaves, and in the development of this friction a portion of the end thrust load is absorbed, and the balance is cushioned so that no sharp impact takes place as would be the case if the end thrust plate were not resiliently supported.

As shown in Fig. 3, the portions of the thrust plate which are adapted to bear against the innermost spring leaf are curved away from the spring leaf at each side, as at 37, so that as the spring leaves become curved as they are deflected, there will be a gradually widening area of contact between the innermost spring leaf and the adjacent face of the end thrust plate. In the embodiment illustrated, the parts are so proportioned that after the spring leaves have been deflected approximately ¼ inch, the outer portions of the thrust plate will be in engagement with the innermost spring leaf, and due to the close proximity of the walls of the recesses 42 which support the spring leaves at their ends, no further deflection of the spring leaves may take place without developing a shearing action of the spring leaves, between the outer ends of the thrust plate and the walls of the recesses 42.

It will be understood, of course, that the resistance offered by the spring leaves increases rapidly as they are deflected, and they are of size and strength that toward the end of their deflecting movement, they offer a tremendous amount of resistance toward endwise movement of the axle relative to the journal box, which resistance will take care of the maximum end thrust loads of the axle developed during operation of the vehicle.

It will be seen from the above that the axle is thus permitted to move a maximum distance of approximately ⅜ inch outwardly with respect to the journal box under the greatest end thrust load conditions, which movement will not be sufficient to permit the shoulder 15 on the axle to come into contact with the inner end of the bearing member 20 so that no wear takes place at this point.

In order to prevent excessive wear of the engaging surfaces of the end of the axle and the end thrust plate, I provide a means for lubricating these surfaces, which means in the embodiment disclosed consists of a ring 44 which is of a diameter considerably larger than the diameter of the flange 32, which ring rests on top of the flange and hangs downwardly so that its lower portion is slightly above the bottom portion of the inner surface of the journal box, which portion contains a supply of oil which is provided to lubricate the contacting surfaces of the bearing member 20 and the bearing portion 22 of the axle, the oil being applied to these surfaces by means of the usual supply of waste 46 which is packed in the bottom portion of the journal box.

The ring 44 is rotated, of course, as the axle rotates and thereby conveys some of the oil from the bottom of the journal box up to the point where the ring rests on the flange 32, from which point the oil works downwardly between the engaging surfaces of the end of the axle and the end thrust plate, thus thoroughly lubricating these surfaces. To further assist the lubrication of these surfaces, a vertically extending oil groove 48 is formed in the face of the end thrust plate, which groove extends upwardly from the bottom of the plate to a point slightly above its middle portion, and serves to distribute the lubricant uniformly over the entire contacting surfaces of the end of the axle and the end thrust plate. A retaining member 50 is secured inside the journal box at the lower portion thereof by means of clips 52 welded or otherwise secured to the journal box, for the purpose of holding the waste 46 in place so that it cannot work outwardly in the journal box and thereby interfere with the free rotation of the ring 44. It will be understood that any other suitable means for lubricating the contacting surfaces of the end of the axle and the end thrust plate may be employed in place of that described above.

Figure 2:
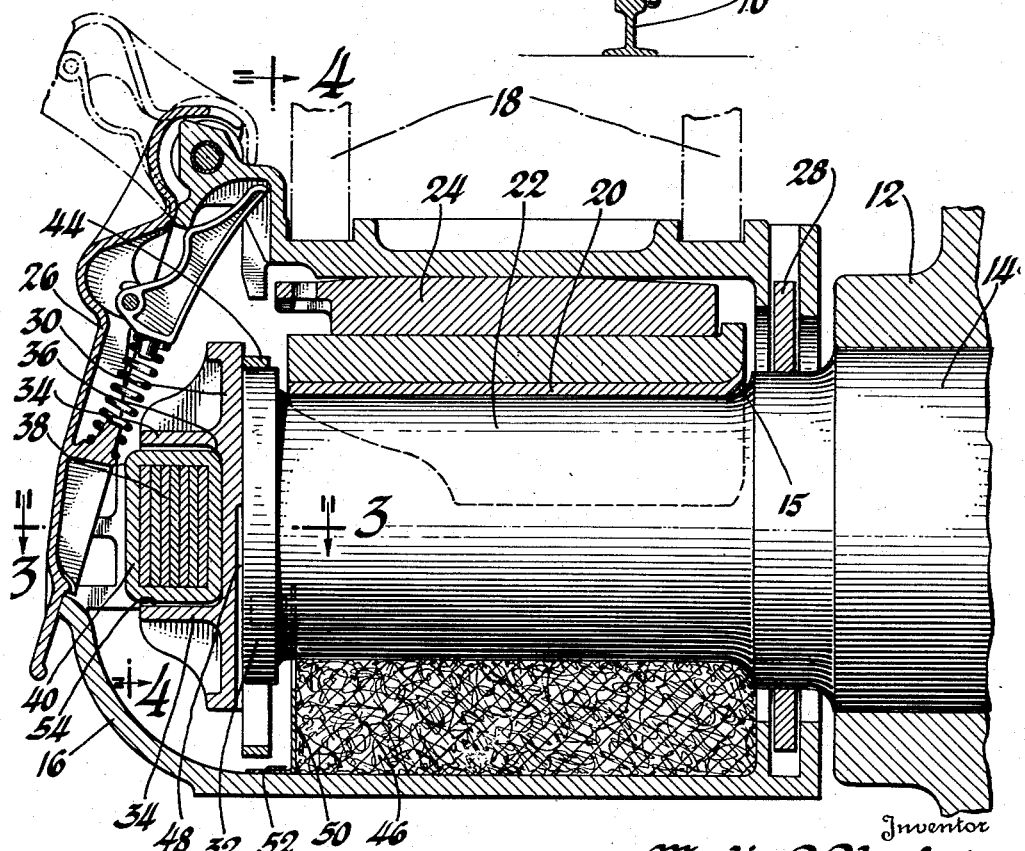
Fig. 2 is a vertical sectional view taken through the journal box showing my invention associated therewith.

As shown in Fig. 2, I provide a slight clearance 54 between the walls or ribs 34 and the top and bottom portions of the clip 40, which clearance permits the end thrust plate 30 to move slightly so that its face can align itself properly with the end of the axle, in order that the entire area of these surfaces may be in contact with each other so that the end thrust load may be distributed over as large an area as possible.

It will be seen from the foregoing that since none of the end thrust load is taken by the bearing member 20, the latter serves only the function of taking the radial load between the journal box and the axle, and since such a relatively large area of bearing surface is provided for this purpose, the bearing member in most cases will outlast the vehicle on which it is used, whereas when this bearing member also has to serve to take the end thrust load as in the conventional construction, it wears rapidly at its ends because of the tremendous loads that are applied to a relatively small area, and consequently often has to be replaced several times during the life of the vehicle. By taking the end thrust load on the plate 30 which has a relatively large area so that the pressure is distributed over a large surface, and by resiliently supporting it so it will not be subjected to severe impacts, its life will be lengthened to such an extent that the cost of maintaining the bearings in satisfactory operating condition will be greatly lowered, and the periods during which the vehicle must be removed from service for replacement of bearings will be reduced to a minimum.

While I have shown and described the resilient means for supporting the end thrust plate as being leaf springs, it will be understood that any other means which will form a suitable resilient support for that member may be employed, and it will likewise be obvious that other changes may be made in the structure illustrated and described without departing from the scope of the appended claims. In the latter, where I describe the purpose of the end thrust plate as being to limit outward movement of the axle relative to the journal box, it should be understood that this language is used merely for convenience of expression, and that it is intended to include the condition wherein the journal box moves inwardly with respect to the axle, in which case the resiliently supported end thrust plate serves the purpose of limiting movement of the journal box inwardly with respect to the axle.

I claim:

1. In combination, an axle, a journal box, a thrust plate located adjacent the end of the axle, said thrust plate having a groove extending across the face remote from the axle, and a multiple leaf spring having its ends supported in the journal box and its central portion lying in the groove in the thrust plate, the portion of the groove against which the leaf spring is adapted to bear being curved to conform to the curvature that the leaf spring assumes as it is deflected by outward movement of the axle relative to the journal box.

2. In combination with an axle and a journal box, a multiple leaf spring located in the journal box adjacent to the end of the axle, portions in the journal box in which the ends of the spring are supported, and a thrust member interposed between the end of the axle and the spring, said thrust member being carried by the spring and being adapted to cushion lateral movement of the axle, the surface of the thrust member which bears against the spring being curved away from the spring at its side edges, the latter extending relatively close to the portions of the journal box which support the ends of the spring so that after the spring has been deflected a predetermined amount, further movement of the thrust member in the direction in which the spring has been deflected will cause the spring to be in direct shearing relation between the sides of the thrust member and the portions in which it is supported in the journal box.

3. In combination with an axle and a journal box, having pockets formed in its side walls, a leaf spring located in the journal box adjacent to the end of the axle and having its ends supported in the pockets in the journal box, and a thrust member interposed between the end of the axle and the spring, the ends of the thrust member being closely adjacent the margins of the pockets, said thrust member being carried by the spring and being constructed and arranged to transmit end thrust forces applied thereto to the center of the spring to subject the latter to bending stresses and, after a predetermined amount of travel of the thrust member relative to the journal box, to transmit further end thrust forces to the leaf spring in such manner as to set up substantially straight shearing stresses in the leaf spring.

4. In combination, an axle, a journal box, pockets formed in the side walls of said journal box, a leaf spring having its ends supported in said pockets, and a one-piece thrust bearing mounted upon the central portion of said spring, said thrust bearing being adapted to limit outward movement of the axle relative to the journal box and being substantially as wide as the space between the pockets, there being clearances provided at the point where the thrust bearing is mounted upon the spring to allow the thrust bearing to have a limited amount of universal movement relative to the axle in order that the thrust bearing may align itself properly with the end of the axle.

5. In a journal box, a journal in said box, a thrust block opposite said journal, spring bearing surfaces in said box, leaf spring means extending through said thrust block and having the ends thereof arranged to cooperate with said spring bearing surfaces, said block having a curved surface cooperating with a surface on said spring means, all of said surfaces being constructed and arranged to transmit thrusts applied to said block to the center of said spring means to subject the latter to bending stresses, and said surfaces on said block and leaf spring being also constructed and arranged to so engage after a predetermined amount of travel of said block relative to said box as to transmit the further thrusts to said block in a way to set up substantially straight shearing stresses in said leaf spring.

6. In combination, an axle, a journal box, a thrust plate located adjacent the end of the axle, said thrust plate having surfaces defining a spring receiving portion, and a multiple leaf spring having its ends supported in the journal box and its central portion lying in said spring receiving portion in the thrust plate, the surface of the spring receiving portion against which the leaf spring is adapted to bear being curved to conform to the curvature that the leaf spring assumes as it is deflected by outward movement of the axle relative to the journal box.

7. In a device of the class described, a journal box, a journal extending into said box, said journal having a thrust receiving surface at its end, leaf spring means mounted in said box opposite the end of the journal and a thrust plate carried upon said leaf spring means between said leaf spring means and the end of the journal for transmitting end thrust of the journal to the leaf spring means, said thrust plate having a curved surface for engaging the surface of the leaf spring means nearest the journal end.

8. In a device of the class described, a journal box, a journal extending into said box, said journal having a thrust surface at its end, a leaf spring mounted in said box opposite the end of the journal and a thrust plate carried by said leaf spring between said leaf spring and the end of the journal for transmitting end thrust of the journal to the leaf spring, said thrust plate having a curved surface for engaging the surface of the leaf spring nearest the journal end and portions extending laterally to points adjacent side surfaces in the journal box to limit lateral movement of the thrust plate in the journal box.

9. In combination, an axle, a journal box, pockets formed in the side walls of said journal box, a leaf spring having its ends supported in said pockets, and a one-piece thrust bearing mounted upon the central portion of said spring, said thrust bearing extending from a point adjacent the edges of the pocket on one side to a point adjacent the edges of the pocket on the opposite side of the journal box and being adapted to limit outward movement of the axle relative to the journal box, the mounting of the thrust bearing upon the spring providing for a limited amount of universal movement of the thrust bearing relative to the axle in order that the thrust bearing may align itself properly with the end of the axle.

MARTIN P. BLOMBERG.